(12) United States Patent
Collinge et al.

(10) Patent No.: US 6,548,093 B1
(45) Date of Patent: Apr. 15, 2003

(54) PROCESS FOR PREPARING STORAGE STABLE LOW MOISTURE PARFRIED POTATO STRIPS

(75) Inventors: Susan F. Collinge, Boise, ID (US); Michael L. Hamann, Caldwell, ID (US); Tracy R. Hitchcock, Boise, ID (US); Jeffrey J. Kester, West Chester, OH (US)

(73) Assignee: J. R. Simplot Company, Boise, ID (US)

( * ) Notice: Subject to any disclaimer, the term of this patent is extended or adjusted under 35 U.S.C. 154(b) by 0 days.

(21) Appl. No.: 09/560,435

(22) Filed: Apr. 27, 2000

Related U.S. Application Data

(60) Provisional application No. 60/131,481, filed on Apr. 29, 1999.

(51) Int. Cl.$^7$ ................................................ A23L 1/217
(52) U.S. Cl. ........................ 426/302; 426/441; 426/637
(58) Field of Search ................................. 426/102, 302, 426/438, 441, 637

(56) References Cited

U.S. PATENT DOCUMENTS

| | | |
|---|---|---|
| 3,397,993 A | 8/1968 | Strong |
| 4,338,911 A | 7/1982 | Smith ........................ 126/21 A |
| 4,523,391 A | 6/1985 | Smith et al. ................ 426/226 |
| 4,542,080 A | 9/1985 | Haury et al. ................ 426/262 |
| 4,590,080 A | 5/1986 | Pinegar ...................... 426/441 |
| 4,900,576 A | 2/1990 | Bonnett et al. ............. 426/438 |
| 5,393,552 A | 2/1995 | Busacker et al. ........... 426/637 |
| 5,648,110 A | 7/1997 | Wu et al. .................... 426/102 |
| 5,753,291 A | 5/1998 | Pederson et al. |
| 5,885,639 A | 3/1999 | Judkins et al. |
| 5,897,898 A | 4/1999 | Rogols et al. .............. 426/102 |
| 6,001,411 A | 12/1999 | Kester et al. ............... 426/637 |
| 6,013,296 A | 1/2000 | Kester et al. ............... 426/302 |
| 6,022,569 A | 2/2000 | Rogols et al. .............. 426/102 |
| 6,042,870 A | 3/2000 | Walsh et al. ................ 426/637 |
| 6,113,957 A | 9/2000 | Mattinson et al. .......... 426/250 |

*Primary Examiner*—Arthur L. Corbin
(74) *Attorney, Agent, or Firm*—Kelly Bauersfeld Lowry & Kelley, LLP

(57) ABSTRACT

Parfried potato strips and a related preparation process are provided wherein the parfried strips have a relatively low moisture content suitable for oven finish or rapid finish fry preparation, and further wherein the parfried strips exhibit improved storage stability without developing undesirable off-flavor characteristics. The parfried potato strips are initially blanched and then surface treated to apply reducing sugar in a controlled amount prior to parfrying in hot oil and freezing. In one form, the surface treatment is a dextrose-containing dip or spray, whereas in another form the surface treatment is a sugar-containing starch-based batter coating. In either case, the quantity of sugar on the exterior surfaces of the strips is regulated in relation to the parfry oil temperature to achieve a target strip color. In a preferred preparation process, the potato strips are subjected to first and second parfry steps in hot oil with an intermediate freeze step prior to final freezing, wherein the quantity of sugar on the exterior surfaces of the strips is regulated in relation to the temperature of the second parfry step to achieve the target strip color.

38 Claims, No Drawings

PROCESS FOR PREPARING STORAGE STABLE LOW MOISTURE PARFRIED POTATO STRIPS

This application claims benefit of 60/131,481, filed Apr. 29, 1999.

BACKGROUND OF THE INVENTION

This invention relates generally to processes for preparing parfried and frozen potato strips such as French fries. More specifically, this invention relates to an improved process and the resultant prepared potato strips which have a relatively low moisture content and are thus adapted for reconstitution or finish preparation in an oven, or alternately for rapid finish fry preparation, with a highly desirable combination of taste, appearance and textural characteristics. In accordance with one important aspect of the invention, the prepared potato strips are resistant to the development of so-called off-flavors during frozen storage prior to finish preparation.

Parfried and frozen potato strips, commonly referred to as French fries, are widely available in the foods industry. These potato products are conventionally prepared by cutting whole potatoes into elongated strips of a desired size and shape, and then partially cooking the potato strips by blanching in hot water or steam. Thereafter, the potato strips are partially fried, or parfried, in hot cooking oil, followed by freezing for packaging, shipping and/or storage. Prior to consumption, the parfried and frozen potato strips are reconstituted or finish prepared typically by finish frying in hot oil. French fried potato strips of this type are utilized extensively in restaurant and food service operations, and particularly in so-called fast food restaurants wherein it is desirable to produce a finish cooked product with a substantially optimized set of quality characteristics and with a relatively short finish fry preparation time.

More specifically, one major objective of potato processors is to provide parfried and frozen potato strips which can be finish prepared with a combination of taste, color, odor, and textural attributes selected for optimum consumer palatibility. For example, it is highly desirable to provide parfried and frozen potato strips which, after finish preparation, exhibit a light and tender but crispy exterior surface of golden brown fried color encasing a soft and mealy interior which is neither too dry nor too soggy. Moreover, especially in a fast food restaurant environment, it is important to provide finish cooked potato strips which can consistently retain these desired sensory qualities for an extended holding period of at least several minutes before actual consumption. In the past, achieving these desirable product qualities on a consistent basis has generally required that the potato strips be finish prepared by frying in hot oil. In a fast food establishment, to avoid advance preparation of potato strips that might not be sold or served within a limited holding time of several minutes, a relatively short finish fry step is desired and is typically on the order of about 2–3.25 minutes for smaller so-called shoestring size cut strips and about 3–4 minutes for larger strips cut sizes.

In recent years, alternative finish preparation methods such as oven heating have been researched in an attempt to eliminate the need to finish fry potato strips at the restaurant or food service facility. In this regard, traditional finish fry preparation methods have required specialized or dedicated frying equipment which must be maintained in a clean and sanitary condition. Moreover, finish frying steps inherently require the food service facility to use and handle significant amounts of cooking oil, with its associated cost and increasingly complex issues of used oil disposal. Further, there is an increased demand among health conscious consumers for food products having a reduced oil or fat content, whereby there is a growing demand for potato strips which are not finish prepared by frying. While these factors all contribute to an increasing interest in potato strips which have been finish prepared by means other than frying, the final product served to the consumer must exhibit a substantially optimized set of taste, appearance and textural characteristics similar to a conventional finish fried product in order to achieve consumer acceptance.

Oven finish preparation of parfried and frozen potato strips has generally involved significant modifications to the parfry preparation steps in order to provide French fry strips suitable for oven reconstitution. Specifically, parfried and frozen potato strips intended for oven finishing are typically processed to a strip moisture content which is lower than the moisture content of conventional parfried and frozen strips intended for finish preparation by frying. For example, conventional frozen French fry strips suitable for finish frying are typically parfried to a moisture content in the range of about 60–70% by weight. When such potato strips intended for finish fry preparation are instead finish prepared by oven heating, the reconstituted French fry strips are undesirably limp and soggy unless subjected to an extended oven heating cycle in which case the strips become excessively dry and tough. Conversely, frozen French fry strips designed for finish preparation by oven heating are normally parfried to a lower moisture content in the range of about 35–55%, and more preferably in the range of about 40–53%, and most preferably about 44–50% by weight. This reduced moisture content may be obtained by subjecting the potato strips to at least two parfry steps with an intermediate chilling or freezing step, prior to final freezing. Such reduced moisture strips can be finish prepared in an air impingement oven, a convection oven, or a conventional oven yet retain a desirable crisp exterior encasing a soft and mealy interior. It has also been recognized that such reduced moisture strips can be finish prepared by frying with a rapid, significantly reduced finish fry preparation time. See, for example, U.S. Pat. No. 4,590,080.

Storage stability problems have been encountered, however, with relatively low moisture parfried and frozen potato strips such as those designed for finish preparation in an oven. In particular, over a relatively short frozen storage period of a few weeks prior to finish preparation, the potato strips tend to develop so-called off-flavor characteristics which are described as stale, warmed over, or cardboard. Such off-flavors can also be detected when the low moisture potato strips are finish prepared by rapid frying, although the degree of off-flavor development can be partially masked by the finish fry step.

As one attempt to address this off-flavor phenomena in low moisture potato strips, it has been proposed to reduce the temperature at which the potato strips are parfried during a second parfry step prior to final freezing. In this regard, it is believed that off-flavor development is linked to end products of browning reactions such as Strecker degradation, and that the development of off-flavors can be minimized or eliminated by controlling the presence of browning reaction components such as 2,5-dimethyl pyrazine. See, U.S. Pat. No. 6,001,411, wherein the level of 2,5-dimethyl pyrazine in low moisture parfried and frozen potato strips is maintained at or below about 0.6 ppm, and preferably less than about 0.4 ppm by reducing the temperature of the cooking oil during a second parfry step to a relatively low level less than 335° F. and preferably within the range of about 290° F. to about 310° F. While this approach is believed to provide improvement with respect to reduced development of off-flavors during frozen storage, it inherently requires a significantly longer parfry time to achieve the target low strip moisture level and thereby also prolongs the production process. In this regard, minor increases in the production process time correlate with a significant and extremely undesirable increase in production cost.

The present invention relates specifically to an improved low moisture parfried and frozen French fried potato strip product and related preparation process, wherein development of off-flavors during frozen storage is substantially reduced or eliminated by regulating the quantity of reducing sugar on the exterior surfaces of the strips prior to parfrying. The present invention provides control of browning reactions during parfrying, without requiring the potato strips to be parfried at a reduced temperature for an extended period of time, whereby the potato strips can be parfried and frozen without extending or prolonging the production process. The level of reducing sugar on the exterior surfaces of the strips is regulated in relation to the parfry temperature to produce strips having a target color when finish prepared by oven heating or by rapid finish frying.

SUMMARY OF THE INVENTION

In accordance with the invention, parfried frozen potato strips and a related preparation process are provided, wherein the potato strips have a relatively low moisture content suitable for oven finish preparation or alternately for rapid finish fry preparation, and further wherein the strips exhibit improved storage stability without developing undesirable off-flavor characteristics. The potato strips are surface treated to apply reducing sugar in a controlled amount prior to parfrying, to control browning reactions during parfrying in hot oil. The quantity of sugar on the exterior surfaces of the strips is regulated in relation to the parfry oil temperature to achieve a target strip color within a range of about 58–67 Agtron scale, and more preferably about 60–65 Agtron scale, and most preferably about 62 Agtron scale, upon subsequent finish preparation. In the parfried and final frozen state, these potato strips have a target strip color within a range of about 68–79 Agtron scale, and more preferably about 70–77 Agtron scale, and most preferably about 72 Agtron scale. Moreover, in the parfried and frozen state, the potato strips are additionally characterized by a relatively low level, less than about 0.6 ppm, and more preferably less than about 0.4 ppm of 2,5-dimethyl pyrazine.

The potato strips are initially blanched and then surface treated to apply reducing sugar in a controlled amount prior to parfrying in hot oil and freezing. In one form, the surface treatment is a dextrose-containing dip or spray, whereas in another form the surface treatment is a sugar-containing starch-based batter coating. In either case, the quantity of reducing sugar added on the exterior surfaces of the strips is regulated in inverse function to the parfry oil temperature to achieve the target strip color in the parfried and final frozen state within a range of about 68–79 Agtron scale, and more preferably about 70–77 Agtron scale, and most preferably about 72 Agtron scale. After finish preparation in an oven or rapid finish fry preparation, these potato strips exhibit a target strip color of about 58–67 Agtron scale, and more preferably about 60–65 Agtron scale, and most preferably about 62 Agtron scale. In a preferred preparation process, the potato strips are subjected to first and second parfry steps in hot oil with an intermediate freeze step prior to final freezing, wherein the quantity of reducing sugar on the exterior surfaces of the strips is regulated in relation to the temperature of the second parfry step to achieve the target strip color.

Other features and advantages of the invention will become more apparent from the following detailed description.

DETAILED DESCRIPTION OF THE PREFERRED EMBODIMENTS

The present invention relates to improved parfried and frozen potato strips having a relatively low moisture content suitable for finish preparation by oven heating or by rapid finish frying, and a related preparation process, wherein the potato strips exhibit improved storage stability in the frozen state without undesirable development of off-flavors. The improved potato strips are surface treated prior to parfrying to regulate the quantity of reducing sugar thereon, in relation to the temperature of a parfry step in hot oil, to control browning reactions during parfrying and thereby achieve a target strip color when the parfried and frozen potato strips are finish prepared. These potato strips are additionally characterized in the parfried and frozen state by a relatively low level of 2,5-dimethyl pyrazine (referred to herein as "pyrazine").

French fry potato strips are conventionally prepared by cutting whole potatoes in a raw and typically peeled state into elongated strips having selected and typically rectangular cross sectional dimensions and a selected length distribution range. For example, traditional so-called shoestring cut French fry potato strips as used widely in fast food restaurants have a generally square cross sectional shape with each side measuring about 0.3 inches in width, and a length distribution ranging from about 2–6 inches. French fry potato strips of this cut style are typically processed to a parfried and frozen state for packaging and shipment to a food service facility where they are normally finish prepared by frying in hot oil immediately prior to serving to consumers. In this regard, over a period of years, consumers have learned to recognize and expect such French fry potato strips to exhibit a certain set of taste, texture, color, and other quality characteristics, such as a light and tender but crispy exterior surface encasing a soft and mealy interior which is neither too dry nor too soggy.

Parfried and frozen potato strips are conventionally processed at a production facility by subjecting the raw cut strips to an initial partial cooking step such as blanching in hot water or steam. The blanched strips are then drained of excess water and, in accordance with one preferred process as described in U.S. Pat. No. 3,397,993, subjected to a drying step for controlled reduction in strip moisture content. In many processes, prior to the drying step, the strips are dipped into or sprayed with a dextrose-based solution which may also include sodium acid pyrophosphate (SAPP) for enhanced browning color development during subsequent frying. The potato strips are then parfried in hot oil followed by freezing and packaging for shipment and/or storage. In this regard, it is not uncommon for the parfried and frozen potato strips to be retained in a frozen state for several weeks prior to finish preparation at a restaurant facility of the like for serving to consumers. For potato strips intended for conventional finish preparation by finish frying in hot oil, the strips typically exhibit a moisture content of about 60%–70% by weight in the parfried and frozen state. Such potato strips are exemplified by those available at McDonald's restaurants.

In recent years, parfried and frozen French fry potato strips have been developed for finish preparation by oven heating, such as by heating in an air impingement oven, a convection oven, or a conventional oven. To provide an oven-finished product which exhibits desirable external crispness, without excessive limpness and sogginess, the parfried and frozen strips are normally processed to a comparatively lower moisture content, typically in the range of about 35%–55% by weight, and more preferably about 40%–53% by weight, and most preferably about 44%–50% by weight. In addition, it has been recognized that such low moisture parfried and frozen potato strips are also suitable for rapid finish fry preparation, with a significantly faster finish fry step in comparison with finish frying of conventional higher moisture frozen parfried strips. See U.S. Pat. No. 4,590,080.

In the past, relatively low moisture frozen parfried potato strips have been produced by subjecting the strips to a pair of parfry steps with an intervening cooling or freezing step, prior to final freezing. However, these low moisture parfried potato strips have exhibited a tendency to develop undesirable off-flavors such as stale and cardboard flavor attributes during a relatively short period of frozen storage prior to finish preparation for consumption. These off-flavors are believed to be linked to browning reactions such, as Strecker degradation reactions and/or Maillard reactions, which occur during frying. The presence of 2,5-dimethyl pyrazine in the parfried and frozen potato strips has been identified as a marker indicative of excessive browning reaction and the likelihood of off-flavor development. In this regard, it has been proposed to reduce the temperature of the second parfry step to obtain parfried and final frozen strips having 2,5-dimethyl pyrazine present in an amount less than about 0.6 ppm, and more preferably less than about 0.4 ppm to reduce or eliminate off-flavor development during frozen storage. See U.S. Pat. No. 6,001,411, which is incorporated by reference herein.

The present invention relates specifically to improved low moisture French fried potato strips suitable for finish preparation in an oven, or alternately for rapid finish fry preparation, wherein the improved potato strips are produced by a parfry preparation process with the presence of reducing sugars on the exterior strip surfaces being controlled to regulate browning reactions during parfrying. In particular, the quantity of reducing sugars on the exterior strip surfaces is regulated in relation to the parfry temperature, and particularly with respect to the temperature of a second parfry step, to achieve a first target product strip color in the parfried and frozen state, and further to achieve a second target strip color in the finish prepared state.

More particularly, regulation of reducing sugars on the exterior surfaces of the potato strips may occur, in accordance with the present invention, by controlling the quantity of reducing sugars in a dextrose-containing coating applied to the strips by dipping or spraying before parfrying, or alternately by controlling the quantity of reducing sugars in a starch-based batter applied to the strips before parfrying. This addition of reducing sugars on the strip surfaces is controlled in a manner to obtain a target strip color in the parfried and frozen state within a range of about 68–79, and more preferably about 70–77, and most preferably about 72, as measured on an Agtron reflectance colorimeter scale. When the strips are finished prepared by oven heating or by a rapid finish fry steps, the strips exhibit a final color within a range of about 58–67, and more preferably within a range of about 60–65, and most preferably about 62 Agtron scale. This post-finish preparation target strip color correlates to a somewhat darker strip color in comparison with the strip color in the parfried and final frozen state.

Such regulation of reducing sugars on the strips exterior surfaces permits the potato strips to be parfried within a broad range of parfry temperatures ranging from about 270° F. up to about 400° F., wherein this parfry temperature range desirably encompasses higher and faster parfry temperatures in the range of 335° F. and higher. Importantly, when potato strips are parfried and frozen according to the present invention, the level of pyrazine in the parfried and frozen strips, remains at or below about 0.6 ppm, and more preferably less than about 0.4 ppm as described in U.S. Pat. No. 6,001,411. When finish prepared by oven heating following a period of time in a frozen storage state, the improved low moisture potato strips of the present invention do not exhibit significant off-flavor attributes but instead closely emulate the highly desirable taste and flavor characteristics of conventional French fried potato strips which have been parfried and frozen to a higher moisture level (about 60%–70% by weight) and then finish prepared by frying in hot oil. Alternately, when finish prepared by frying, the finish preparation fry step may beneficially proceed with an extremely rapid or short finish preparation time, on the order of about 30–120 seconds, and preferably about 60–70 seconds, while achieving a finished product having highly desirable taste, texture and appearance characteristics closely emulating the traits of traditional higher moisture strips which are finish fried for a longer period of time.

In one preferred and exemplary form of the invention, elongated shoestring size potato strips are cut to a desired size and shape from raw whole peeled and trimmed potatoes, such as Russet Burbank, Shepody, or other potato varieties used commonly in the production of parfried and frozen French fry potato strips. Specifically, these potatoes are cut into strips of generally square cross sectional shape with the width of each cut strip side on the order of about 0.29–0.30 inch. The lengths of the cut potato strips vary according to the size of the potatoes being cut, with, a typical length ranging from about 2 inches to about 6 inches. The cut strips prepared as described desirably have a length distribution of at least about 30% having a length exceeding three inches, and not more than about 20% having a length less than two inches.

These raw-cut shoestring potato strips are partially cooked by water blanching in hot water or steam, such as blanching at approximately 155–200° F. for about 2–15 minutes. Following the water blanching step, the strips may be subjected to an optional leaching step in warm water at a temperature of about 110–155° F. for about 1–20 minutes to leach excess reducing sugars from the exterior surfaces of the strips. Thereafter, the strips are subjected to a water-based surface coating including minor amounts of dextrose and, if desired, sodium acid pyrophosphate (SAPP) applied by dipping or by spraying. In a preferred form, to achieve the target colors, this water-based surface coating includes dextrose in an amount of approximately 0.2% by weight. The blanched and coated potato strips are then drained of excess water and optionally can be dried in any suitable manner, such as by exposure to heated or warm ambient air for a sufficient time to achieve a strip weight loss on the order of up to about 15%.

Thereafter, the potato strips are subjected to first and second parfry steps in succession, with an intervening step during which the once-parfried strips are chilled and preferably frozen. More particularly, the potato strips are subjected to a first parfry step in hot oil for further partial cooking. This first parfry step is of relatively short duration, about 30–100 seconds, and preferably about 30–60 seconds, and takes place in hot oil at a temperature of about 350–395° F. A vegetable oil, such as a soy-based oil, is preferred. However, it will be recognized and understood that other cooking oils may be used such as animal oil, or combinations of vegetable and animal oils. In this regard, it will be further understood that the cooking oil may comprise any of a wide range of natural and synthetic fats or oils consisting essentially of triglycerides, as well as non-toxic fat-like materials having properties similar to triglycerides and commonly referred to as fat substitutes which may be fully or partly indigestible. Non-digestible cooking oils are identified in more detail in U.S. Pat. No. 6,001,411. In a dual parfry process, It is believed to be important to maintain the moisture level of the once-parfried strips at a relatively high level, preferably in the range of from about 60% to about 68% by weight, and more preferably at least about 64% by weight, in order to obtain finish prepared products of optimal taste, texture and appearance characteristics.

The once-parfried potato strips are removed from the hot oil and are promptly frozen as by blast freezing in a typical commercial blast freezer at about −15° F. The once-parfried and frozen potato strips are then subjected without prior thawing to a second parfry step, also of relatively short duration of about 60–330 seconds, in hot oil such as a soy-based vegetable oil at a temperature of about 270–400° F. for further partial cooking, after which the strips are promptly frozen a second time as by blast freezing at about −15° F. The specific duration of the second parfry step generally will be inversely proportional to the specific duration of the first parfry'step. The twice-parfried and twice-frozen potato strips are packaged in a normal manner for shipment and/or storage in the frozen state, awaiting finish preparation for consumption.

In the twice-parfried and twice-frozen state, the French fried potato strips exhibit a relatively low moisture content within the range of about 35% to about 55%, and more preferably within a range of between about 40% to about 53%, and most preferably within a range of from about 44% to about 50% by weight. In this regard, to achieve a substantially optimized balance of product quality characteristics in the finish-prepared state, a product moisture level within the approximate 44%–50% range is consistent with achieving quality crispness in a desirably short oven finish preparation time, or alternately in a rapid finish fry preparation time. For product strips having a moisture level significantly above 52%, crispness levels are adversely affected unless the finish preparation time and/or temperature is significantly and undesirably increased. For product strips having a moisture level significantly below about 40%, the finish-prepared strips tend to exhibit undesirable traits of excessive toughness, stiffness, and dryness.

In addition, in the twice-parfried and final frozen state, these potato strips exhibit a target color within the range of about 68–79 units, and more preferably about 70–77 units, and most preferably about 72 units, as measured on an Agtron reflectance colorimeter scale. In this regard, the potato strips were analyzed for color by the use of an Agtron Model E15-F reflectance calorimeter, available from Agtron, Inc., of Reno, Nev. This preferred target color in the parfried and final frozen states yields, when the strips are finish prepared by oven heating or by rapid finish frying, finish prepared strips having a target color which corresponds with a control product comprising conventional higher moisture French fried potato strips of substantially optimized taste and texture characteristics which have been parfried a single time before freezing, followed by finish preparation by frying in hot oil, generally in conformance with the process shown and described in U.S. Pat. No. 3,397,993. Such control product has a significantly higher moisture content of about 60%–70% in the parfried and frozen state.

For oven finish preparation, the twice-parfried and twice-frozen potato strips are reconstituted in an oven, such as a forced air convection oven, e.g., a double air impingement oven of the type having vertically opposed upwardly and downwardly directed jets of substantially collimated and heated air aimed toward a moving belt for transporting the potato strips through the oven. More particularly, the potato strips are placed while frozen in a relatively shallow layer, preferably having a bed depth not to exceed about one inch, directly onto the moving belt or onto a shallow tray or pan formed from a relatively high thermal heat transfer material, and exposed within the oven to the opposed heated air jets directed substantially perpendicular to the layer of strips. In an exemplary double air impingement oven, such air jets provide a relatively combined high mass flow on the order of about 1000–4000 cubic feet per minute (cfm), and preferably on the order of about 1100–2500 cfm. The potato strips are heated within the oven at a temperature of about 375–450° F. for a short finish preparation time of about 1–4 minutes (60–240 seconds), comparable to the finish preparation time for parfried and frozen potato strips reconstituted by finish frying in a fast food restaurant. Exemplary air impingement ovens of this general type are disclosed, for example, in U.S. Pat. Nos. 4,338,911 and 4,523,391. Such ovens are available commercially from Lincoln Foodservice Product, Inc. of Fort Wayne, Ind., under the product designation Impinger II, or from Berkel Company of LaPorte, Ind., under the product designation Rofry (formerly available from Middlebury Cooking Systems Group of Elgin, Ill.).

Upon removal from the oven, the reheated potato strips may be promptly sprayed with a light mist of cooking oil, such as a soy-based vegetable oil of the type used in the parfry steps previously described, to impart a taste and mouth feel more closely emulating a traditional finish fried product. The strips are then salted preparatory to bagging or other appropriate handling for serving to the consumer.

In the finished form, these oven-heated potato strips exhibit the desired target color within the range of about 58–67 Agtron units, and more preferably within the range about of 60–65 Agtron units, and most preferably about 62 Agtron units. As noted above, the preferred oven finished target color of about 62 Agtron units corresponds closely with a control product comprising French fried potato strips of substantially optimized taste and texture characteristics which have been parfried (to a higher moisture level) a single time before freezing, followed by finish preparation by frying in hot oil. The low moisture oven finished potato strips of the present invention were then analyzed for taste attributes by a trained sensory panel, in comparison with the above-described finish fried control product, and found to be substantially comparable thereto to indicate a substantial absence of off-flavor generation.

For rapid finish fry preparation, the twice-parfried and twice-frozen potato strips are finish fried in hot oil, such as a soy-based vegetable oil or the like of the type used in the parfry steps, for a short finish fry cycle time on the order of about 30–12 seconds, and preferably about 60–70 seconds, at a finish fry temperature of about 335° F. to about 395° F., and preferably about 350° F. The thus-fried strips are removed from the hot oil, briefly drained, and then salted preparatory to bagging or other appropriate handling for serving to the consumer.

In the finish fried form, the potato strips of the present invention also exhibit the desired target color within the range of about 58–67 Agtron units, and more preferably within the range of about 60–65 Agtron units, and most preferably about 62 Agtron units. These finish fried strips, subjected to dual pre-process parfry steps and exhibiting a relatively low moisture in the 44%–50% by weight range in the parfried and frozen state, closely correspond with a control product comprising finish fried strips of substantially optimized taste and textural characteristics which have been parfried a single time before freezing (and exhibit a higher moisture content in the 60%–70% by weight range in the parfried and frozen state).

To demonstrate the invention, freshly cut shoestring size potato strips were prepared in substantially identical 12 pound batches according to the general preparation process sequence and parameters as set forth above, and following substantially identical process conditions except for different dextrose concentrations present in the dextrose-containing water-based solution applied to the exterior strip surfaces before parfrying. Specifically, in Example 1, the water-based solution contained no dextrose at all, intended to produce French fry potato strips having inadequate color development (i.e., an Agtron unit score higher than the target ranges in the parfried frozen state, and in the finish prepared state). In Example 2, a dextrose concentration of 0.2% by weight was used, intended to produce potato strips substantially meeting the target color specifications of the present invention. In Example 3, a dextrose concentration of 0.6% by weight was used, intended to produce potato strips having excessive color development (i.e., an Agtron unit score lower than the target ranges). In a higher moisture control product (in the parfried and frozen state) identified as Example 4, which was finish prepared by frying, a dextrose concentration of 0.2% by weight was used. These Examples 1–4 were parfried and frozen according to the specific process parameters set forth in Table 1 as follows:

TABLE 1

| | EXAMPLE 1 | EXAMPLE 2 | EXAMPLE 3 | EXAMPLE 4 |
|---|---|---|---|---|
| Water Blanch Time | 3.5 min. | 3.5 min. | 3.5 min. | 3.5 min. |
| Water Blanch Temperature | 175° F. | 175° F. | 175° F. | 175° F. |
| Leach Time | 6 min. | 6 min. | 6 min. | 6 min. |
| Leach Temp. | 150° F. | 150° F. | 150° F. | 150° F. |
| Dextrose/SAPP Dip Time | 30 sec. | 30 sec. | 30 sec. | 30 sec. |
| Dextrose/SAPP Dip Temp. | 140° F. | 140° F. | 140° F. | 140° F. |
| Dextrose Conc. | 0.0% | 0.2% | 0.6% | 0.2% |
| SAPP Conc. | 0.5% | 0.5% | 0.5% | 0.5% |
| Dryer Air Temp. | 160° F. | 160° F. | 160° F. | 160° F. |
| Dryer Weight Loss | 13.9% | 13.5% | 14.1% | 12.4% |
| 1st Parfry Time | 45 sec. | 45 sec. | 45 sec. | 45 sec. |
| 1st Parfry Temp. | 375° F. | 375° F. | 375° F. | 375° F. |
| 1st Freeze Time | 20 min. | 20 min. | 20 min. | 20 min. |
| 1st Freeze Temp. | −15° F. | −15° F. | −15° F. | −15° F. |
| 2d Parfry Time | 150 sec. | 150 sec. | 150 sec. | N/A |
| 2d Parfry Temp. | 335° F. | 335° F. | 335° F. | N/A |
| 2d Freeze Time | 20 min. | 20 min. | 20 min. | N/A |
| 2d Freeze Temp. | −15° F. | −15° F. | −15° F. | N/A |

TABLE 1-continued

| | EXAMPLE 1 | EXAMPLE 2 | EXAMPLE 3 | EXAMPLE 4 |
|---|---|---|---|---|
| % Moisture, Parfried & Frozen | 48.4% | 50.5% | 50.0% | 67.6% |
| Final Frozen Agtron Color | 79.7 | 71.2 | 65.8 | 85.4 |
| Finish Prep. Type | OVEN | OVEN | OVEN | FRY |
| Finish Prep. Time. | 135 sec. | 135 sec. | 135 sec. | 190 sec. |
| Finish Prep. Temp. | 395° F. | 395° F. | 395° F. | 335° F. |
| Finish Agtron Color | 70 | 62.2 | 52.5 | 63.5 |

The data set forth in Table 1 indicates that the potato strips of Example 1 were lighter in color than the target color range in both the parfried and final frozen, as well as the oven finished states. Similarly, the data shows that the potato strips of Example 3 were darker in color than the target color range at both the final frozen and oven finished states. The potato strips of Example 2, however, scored 71.2 Agtron units in the final frozen state and 62.2 Agtron units in the oven finished state. Both of these scores for Example 2 were well within the target ranges. Moreover, in the-oven finished state, the potato strips of Example 2 closely mirrored the color reading (63.5 Agtron units) for the finished fried control product of Example 4. In this regard, the color reading for the potato strips of Example 4 in the final frozen state (85.4 Agtron units) was expectedly lighter (i.e, higher) than the target color range for final frozen strips of the present invention, since the strips of Example 4 were subjected to a single parfry step before final freezing at a significantly higher moisture content (67.6% by weight) and would thus exhibit less color development in the final frozen state and a requirement for comparatively greater development of color during such finish fry preparation to achieve the finish fried color level of 63.5 Agtron units.

The finish prepared potato strips of Examples 1–4 were analyzed by a trained sensory panel particularly with respect to flavor attributes indicative of off-flavors of the type encountered with low moisture potato strips during frozen storage. This analysis was conducted at the end of a 4 minute holding time following finish preparation, wherein such holding time is typical prior to serving the finish prepared strips to a customer in a fast food restaurant environment. The sensory panel focused primarily upon flavor attributes such as stale, warmed over, cardboard, and the overall development of taste, texture and appearance characteristics emulating potato strips such as the control product of Example 4 which was finish prepared by frying. The sensory panel concluded that the oven finished potato strips of Example 2 not only closely mirrored the finish fried strips of Example 4 in color, but also closely emulated the finish fried strips of Example 4 in terms of the absence of off-flavor attributes. By contrast, the sensory panel noted the presence of significant off-flavor attributes in the lighter colored oven finished strips of Example 1, and also in the darker colored oven finished strips of Example 3.

Further examples were then processed to verify that the low moisture parfried potato strips of the present invention can be subjected to a second parfry step at a range of different oil temperatures (and times), with the concentration of dextrose in the pre-parfry dip solution adjusted in relation to the second parfry temperature to obtain a final frozen product as well as an oven finished product within the target color ranges on the Agtron scale. Specifically, Examples 5–7 were processed generally according to the process parameters cited in Table 1 above, except for variations in the dextrose dip concentration and the second parfry parameters as noted in Table 2 below:

TABLE 2

|  | EXAMPLE 5 | EXAMPLE 6 | EXAMPLE 7 |
|---|---|---|---|
| Dextrose Conc. | 0.05% | 0% | 0.25% |
| 2d Parfty Time | 130 sec. | 158 sec. | 300 sec. |
| 2d Parfry Temp. | 380° F. | 350° F. | 290° F. |
| Final Frozen Agtron Color | 74.4 | 75.2 | 75.2 |
| Oven Finish Agtron Color | 61.2 | 61.5 | 61.7 |
| 2,5-dimethyl pyrazine (parfried & frozen) | 0.31 ppm | 0.15 ppm | 0.35 ppm |

These potato strips of Examples 5–7 were also presented to the trained sensory panel for analysis and comparison with the finish fried control product of Example 4. Despite the variations in the dextrose concentration and the time/temperature parameters of the second parfry step, the potato strips of Examples 5–7 exhibited a color at the final frozen state and also at the oven finished state within the target color ranges. As additionally noted in Table 2 above, each of the Examples 5–7 exhibited a pyrazine level in the parfried and final frozen state of less than 0.4 ppm. The sensory panel considered these potato strips along the same criteria as discussed above with respect to Examples 1–4, and each of the Examples 5–7 rated as close replications of the finish fried strips of Example 4 in terms of the absence of off-flavor attributes and other taste, texture and appearance characteristics.

Additional examples were processed and analyzed to verify suitability of the twice-parfried and twice-frozen low moisture potato strips for rapid fry finish preparation by frying in hot oil. Specifically, Examples 8 through 14 are tabulated in Table 3 below, wherein each of these Examples 8–14 comprised twice-parfried and twice-frozen strips prepared according to Examples 1–3 except that the dextrose concentration of the pre-parfry dip or spray surface coating was adjusted to demonstrate that optimal finish prepared strips result when the dextrose concentration is adjusted to achieve the target strip color.

TABLE 3

|  | Ex. 8 | Ex. 9 | Ex. 10 | Ex. 11 | Ex. 12 | Ex. 13 | Ex. 14 |
|---|---|---|---|---|---|---|---|
| Dextrose Conc. | 0.8% | 0.7% | 0.6% | 0.4% | 0.3% | 0.2% | 0.1% |
| % Moisture, Parfried & Frozen | 48.4% | 50.0% | 49.8% | 51.2% | 49.7% | 52.2% | 50.2% |
| Final Frozen Agtron Color | 61 | 57 | 63 | 67 | 73 | 75 | 81 |
| Finish Fry Temp. | 350° F. | 350° F. | 350° F. | 350° F. | 350° F. | 350° F. | 350° F. |
| Finish Fry Time | 65 sec. | 65 sec. | 65 sec. | 65 sec. | 65 sec. | 65 sec. | 65 sec. |
| Finish Fry Agtron Color | 46 | 51 | 53 | 59 | 62 | 66 | 71 |
| 2,5 dimethyl pyrazine (parfried & frozen) | 0.30 ppm | 0.25 ppm | 0.19 ppm | 0.21 ppm | 0.17 ppm | 0.20 ppm | 0.14 ppm |

The foregoing Table 3 reflects a greater development of color in strips which were dipped in a higher concentration dextrose solution prior to the parfry steps, and a progressively lesser development of color in strips which were dipped in a dextrose solution of lower concentration. Examples 8 through 10 exhibited color readings significantly below the target range of about 68–79 on the Agtron scale in the parfried and final frozen state, and also below the target range of about 58–67 on the Agtron scale in the finish fried state. When the strips of Examples 8 through 10 were analyzed by the trained sensory panel, these groups of strips were graded as unsatisfactory due to excessive color development and the presence of off-flavor attributes particularly such as warmed over flavor. By contrast, the strips of Example 14 exhibited a color reading above the target range of about 70–77 on the Agtron scale in the parfried and frozen state, and also above the target range of about 58–67 on the Agtron scale in the finish fried state. These strips of Example 14 were graded by the trained sensory panel as unsatisfactory due to inadequate color development. The strips of Examples 11 through 13 exhibited color readings generally within the desired range, and these strips were rated by the sensory panel as possessing characteristics of taste, texture and appearance closely emulating characteristics of the single-parfried (and higher moisture in the parfried and frozen state) control product of Example 4. The strips of Example 12, exhibiting a color reading of 73 Agtron units in the parfried and final frozen state, and a color reading of 62 Agtron units in the finish fried state, achieved the best scores from the sensory panel, with a substantial absence of warmed over flavor. Notably, the pyrazine level for all of Examples 8 through 14 was less than 0.6 ppm.

Further Examples 15 through 19 were prepared to demonstrate that the temperature (and time) of the second parfry step can be adjusted in relation to the dextrose concentration of the pre-parfry dip, to achieve the desired target color when the strips are finish prepared by rapid finish frying. More specifically, as tabulated in Table 4 below, Examples 15 through 19 represent groups of potato strips prepared generally according to Examples 1–3, except that the dextrose concentration of the pre-parfry dip solution was varied generally in inverse relation to the temperature of the second parfry step, with dextrose concentration ranges from 0.35% to 0.15%, and correlated parfry temperatures ranging from 290–380° F. In each of the Examples 15–19, the potato strips were then finish prepared by rapid finish frying in hot oil at a temperature of about 350° F. for about 65 seconds, to result in finish prepared strips having a color reading within the preferred range of 58–67 on the Agtron scale. Each of the Examples 15–19 were rated by the trained sensory panel as closely emulating the taste, texture and appearance characteristics of the single-parfried and finish fried control group of Example 4. In addition, the pyrazine level for each of Examples 15–19 was less than 0.6 ppm.

TABLE 4

|  | Ex. 15 | Ex. 16 | Ex. 17 | Ex. 18 | Ex. 19 |
| --- | --- | --- | --- | --- | --- |
| Dextrose Conc. | 0.35% | 0.35% | 0.3% | 0.2% | 0.1% |
| % Moisture, Parfried & Frozen | 49.1% | 50.6% | 51.3% | 50.6% | 52.8% |
| 2d Parfry Temp. | 290° F. | 320° F. | 335° F. | 350° F. | 380° F. |
| 2d Parfry Time | 220 sec. | 145 sec. | 135 sec. | 115 sec. | 90 sec. |
| Final Frozen Agtron Color | 71 | 73 | 72 | 75 | 79 |
| Finish Fry Temp. | 350° F. | 350° F. | 350° F. | 350° F. | 350° F. |
| Finish Fry Time | 65 sec. | 65 sec. | 65 sec. | 65 sec. | 65 sec. |
| Finish Fry Agtron Color | 59 | 61 | 61 | 62 | 64 |
| 2,5 dimethyl pyrazine (parfried & frozen) | 0.17 ppm | 0.19 ppm | 0.20 ppm | 0.22 ppm | 0.41 ppm |

In accordance with an alternative preferred form of the invention, the quantity of reducing sugar on the external surfaces of the low moisture parfried and frozen potato strips can also be regulated in-relation to parfry time and temperature by regulating the concentration of reducing sugar in a starch-based batter coating applied to the strips before parfrying. In this regard, batter coated potato strips processed to a relatively low strip moisture-content within the range of about 35%–55%, and more preferably within the range of about 40%–53%, and most preferably within the range of about 44%–50%, have been developed for finish preparation in an oven. See copending U.S. Ser. No. 09/182,618, filed Oct. 29, 1998, now U.S. Pat. No. 6,132,785, which is incorporated by reference herein. Such low moisture batter coated strips are processed in accordance with the dual parfry and dual freeze steps as set forth generally herein with respect to the embodiment of the invention employing control of reducing sugar by regulating the dextrose concentration in a pre-parfry dip or spray, with the exception that the pre-parfry dip or spray comprises a so-called clear coat starch-based batter having one or more reducing sugar constituents such as corn syrup. One preferred clear coat batter of this type is described in copending U.S. Provisional Appln. No. 60/108,733, filed Nov. 17, 1998, and related utility Ser. No. 09/441,112, filed Nov. 17, 1999 now abandoned, which is also incorporated by reference herein.

Appropriate regulation of the concentration of reducing sugar present in the starch-based batter in relation to the time and temperature of a second parfry step, as by varying the proportion of corn syrup, may be employed to yield batter coated low moisture parfried and final frozen potato strips within the target color range of about 68–79 Agtron units, and which thereafter when finish prepared in an oven or by rapid finish frying fall within the target color range of about 58–67 Agtron units. Such batter coated strips, when finish prepared, closely emulate conventional finish fried potato strips such as those described in Example 4 above, in terms of the absence of flavor attributes such as stale, warmed over, and cardboard characteristics which are indicative of off-flavor development during frozen storage. Moreover, such batter coated oven finished strips closely emulate the overall taste, texture and appearance characteristics of conventional finish fried strips. By contrast, however, for batter coated potato strips processed in a manner to exhibit color falling outside the target color ranges, the sensory panel noted the presence of significant off-flavor attributes of the type developed during frozen storage.

A variety of further modifications and improvements in and to the improved low moisture potato strips and related preparation process of the present invention will be apparent to those skilled in the art. For example, while the invention has been described with respect to regulating the reducing sugar concentration in a dextrose-containing pre-parfry dip, or by regulating the reducing sugar concentration in a starch-based batter coating applied before parfrying, it will be recognized and understood that reducing sugar regulation may occur by a combination of these techniques to achieve the desired target strip color. Accordingly, no limitation on the invention is intended by way of the foregoing description, except as set forth in the appended claims.

What is claimed is:

1. A process for preparing French fry potato strips, comprising the steps of:
   water blanching raw cut potato strips;
   applying a dextrose-containing surface coating to the exterior surfaces of the blanched potato strips;
   parfrying the surface-coated potato strips in hot oil in successive first and second parfry steps with an intermediate cooling step, for a time and temperature sufficient to reduce the moisture content of the twice parfried potato strips to from about 35% to about 55% by weight; and
   freezing the parfried potato strips;
   wherein the concentration of dextrose in the dextrose-containing surface coating is selected relative to the temperature of the parfry step to provide parfried and frozen French fry potato strips having a target color within the range of from about 68 to about 79 Agtron units.

2. The process of claim 1 wherein the dextrose concentration is selected relative to the parfry temperature to provide parfried and frozen French fry potato strips having a target color within the range of from about 70 to about 77 Agtron units.

3. The process of claim 1 wherein the dextrose concentration is selected relative to the parfry temperature to provide parfried and frozen French fry potato strips having a target color of about 72 Agtron units.

4. The process of claim 1 wherein said blanching step comprises partially cooking the potato strips in hot water.

5. The process of claim 1 wherein said blanching step comprises partially cooking the potato strips in steam.

6. The process of claim 1 further including leaching excess reducing sugars from the exterior surfaces of the blanched strips by dipping the blanched strips in a water bath prior to said surface coating applying step.

7. The process of claim 1 wherein said surface coating applying step comprises dipping the blanched potato strips in a water-based dextrose-containing solution.

8. The process of claim 1 wherein said surface coating applying step comprises spraying the blanched potato strips with a water-based dextrose-containing solution.

9. The process of claim 1 wherein said surface coating applying step comprises coating the exterior surfaces of the blanched potato strips with a starch-based batter.

10. The process of claim 1 further including the step of drying the surface-coated potato strips in air prior to said parfrying step.

11. The process of claim 1 wherein said parfrying step reduces the moisture content of the parfried potato strips to a moisture content of from about 40% to about 53% by weight.

12. The process of claim 1 wherein said parfrying step reduces the moisture content of the parfried potato strips to a moisture content of from about 44% to about 50% by weight.

13. The process of claim 1 wherein the once-parfried potato strips have a moisture content of about 60% to about 68% by weight.

14. The process of claim 1 wherein said second parfry step occurs at a temperature of about 270° F. to about 400° F.

15. The process of claim 1 wherein said intermediate cooling step comprises freezing the once-parfried strips.

16. The process of claim 1 further including the step of finish preparing the parfried and frozen potato strips to provide parfried and frozen French fry potato strips having a target color within the range of from about 58 to about 67 Agtron units.

17. The process of claim 16 wherein said finish preparing step comprises oven heating.

18. The process of claim 16 wherein said finish preparing step comprises finish frying.

19. The process of claim 18 wherein said finish frying step comprises frying the parfried and frozen potato strips in hot oil for a time of about 30–120 seconds.

20. The process of claim 18 wherein said finish frying step comprises frying the parfried and frozen potato strips in hot oil for a time of about 60–70 seconds.

21. The process of claim 18 wherein the finished prepared strips have a target color of from about 60 to about 65 Agtron units.

22. The process of claim 18 wherein the finish prepared strips have a target color of about 62 Agtron units.

23. A process for preparing French fry potato strips, comprising the steps of:
   water blanching raw cut potato strips;
   applying a dextrose-containing surface coating to the exterior surfaces of the blanched potato strips;
   parfrying the surface-coated potato strips in hot oil in successive first and second parfry steps with an intermediate cooling step, to reduce the moisture content of the twice parfried potato strips to from about 35% to about 55% by weight;
   freezing the parfried potato strips, wherein the concentration of dextrose in the dextrose-containing surface coating is selected relative to the temperature of the second parfry stop to provide parfried and frozen French fry potato strips having a target color within the range of from about 68 to about 79 Agtron units; and
   finish preparing the parfried and frozen potato strips to provide parfried and frozen French fry potato strips having a target color within the range of from about 58 to about 67 Agtron units.

24. The process of claim 23 wherein the once-parfried potato strips have a moisture content of about 60% to about 68% by weight.

25. The process of claim 23 wherein the dextrose concentration is selected relative to the parfry temperature to provide parfried and frozen French fry potato strips having a target color within the range of from about 70 to about 77 Agtron units, and the finish prepared strips having a target color of from about 60 to about 65 Agtron units.

26. The process of claim 23 wherein the dextrose concentration is selected relative to the parfry temperature to provide parfried and frozen French fry potato strips having a target color of about 72 Agtron units, and the finish prepared strips having a target color of about 62 Agtron units.

27. The process of claim 23 wherein said blanching step comprises partially cooking the potato strips in hot water or steam, and further including the step of leaching excess reducing sugars from the exterior surfaces of the blanched strips by dipping the blanched strips in a water bath prior to said surface coating applying step.

28. The process of claim 23 wherein said surface coating applying step comprises dipping the blanched potato strips in a water-based dextrose-containing solution.

29. The process of claim 23 wherein said surface coating applying step comprises spraying the blanched potato strips with a water-based dextrose-containing solution.

30. The process of claim 23 wherein said surface coating applying step comprises coating the exterior surfaces of the blanched potato strips with a starch-based batter.

31. The process of claim 23 further including the step of drying the surface-coated potato strips in air prior to said parfrying step.

32. The process of claim 23 wherein said parfrying step reduces the moisture content of the parfried potato strips to a moisture content of from about 40% to about 53% by weight.

33. The process of claim 23 wherein said parfrying step reduces the moisture content of the parfried potato strips to a moisture content of from about 44% to about 50% by weight.

34. The process of claim 23 wherein said second parfry step occurs at a temperature of about 270° F. to about 400° F.

35. The process of claim 23 wherein said intermediate cooling step comprises freezing the once-parfried strips.

36. The process of claim 23 wherein said finish preparing step comprises oven heating.

37. The process of claim 23 wherein said finish preparing step comprises finish frying.

38. The process of claim 23 wherein said finish frying step comprises frying the parfried and frozen potato strips in hot oil for a time of about 30–120 seconds.

* * * * *